United States Patent
Ichimaru

(10) Patent No.: US 7,261,531 B2
(45) Date of Patent: Aug. 28, 2007

(54) FLUID SUPPLY/DISCHARGE HEAD OF BLADDER IN TIRE VULCANIZING MACHINE

(75) Inventor: Hironobu Ichimaru, Chikugo (JP)

(73) Assignee: Ichimaru Giken Co., Ltd., Chikugo-shi (JP)

( * ) Notice: Subject to any disclaimer, the term of this patent is extended or adjusted under 35 U.S.C. 154(b) by 0 days.

(21) Appl. No.: 10/541,658

(22) PCT Filed: Dec. 25, 2003

(86) PCT No.: PCT/JP03/16833

§ 371 (c)(1),
(2), (4) Date: Jul. 6, 2005

(87) PCT Pub. No.: WO2004/062871

PCT Pub. Date: Jul. 29, 2004

(65) Prior Publication Data

US 2006/0115547 A1    Jun. 1, 2006

(30) Foreign Application Priority Data

Jan. 8, 2003   (JP)   ............................. 2003-002497

(51) Int. Cl.
  *B29C 35/02*   (2006.01)
(52) U.S. Cl. .......................................... 425/43; 425/52
(58) Field of Classification Search ................ 425/42, 425/43, 50, 52
See application file for complete search history.

(56) References Cited

U.S. PATENT DOCUMENTS

| | | | |
|---|---|---|---|
| 3,329,748 A | 7/1967 | Hugger | |
| 4,684,338 A * | 8/1987 | Steidl et al. | 425/43 |
| 4,863,360 A * | 9/1989 | Chuchanis | 425/42 |
| 5,147,656 A * | 9/1992 | Kubota et al. | 425/42 |
| 5,378,425 A * | 1/1995 | Kubota et al. | 264/315 |

FOREIGN PATENT DOCUMENTS

| | | |
|---|---|---|
| GB | 0980043 A | 1/1965 |
| JP | 61-57314 A | 3/1986 |
| JP | 2000-108128 A | 4/2000 |
| JP | 2001-30270 A | 2/2001 |
| JP | 2002-120228 A | 4/2002 |

\* cited by examiner

*Primary Examiner*—James P. Mackey
(74) *Attorney, Agent, or Firm*—Flynn, Thiel, Boutell & Tanis, P.C.

(57) ABSTRACT

By increasing an area of the fluid discharge ports to increase a discharge capacity, drain water can quickly be discharged. Furthermore, the number of fluid supply ports is increased and the ports are equally spaced to thereby quickly and uniformly fill a heated steam or the like into a bladder. As a result, it is possible to reduce a cycle time of a tire vulcanizing step to thereby increase productivity in a fluid supply/discharge head of the bladder in a tire vulcanizing machine. In the tire vulcanizing machine, the fluid supply ports and the fluid discharge ports which are open to face an inside of the bladder are formed in the head block, the fluid discharge ports are disposed on the lower side of the head block, the fluid supply ports are disposed on the upper side of the head block, and the fluid discharge ports and the fluid supply ports are not disposed on the same plane.

1 Claim, 6 Drawing Sheets

FLUID SUPPLY/DISCHARGE HEAD OF BLADDER IN TIRE VULCANIZING MACHINE

TECHNICAL FIELD

The present invention relates to a fluid supply/discharge head for supplying and discharging a fluid (such as a heated steam) to a bladder provided in a tire vulcanizing machine.

BACKGROUND ART

The tire vulcanizing machine is provided with upper and lower metal molds and a bladder expanded and contracted by supplying and discharging the fluid, and is structured such as to vulcanize and mold a green tire by pressing the bladder expanded by supplying the fluid to an inner surface of the green tire which is set to an inner portion of the metal molds (see Patent Documents 1, 2, for example).

(Patent Document 1)
Japanese Patent Application Laid-open No. 2001-30270

(Patent Document 2)
Japanese Patent Application Laid-open No. 2002-120228

The fluid is supplied and discharged to and from the bladder through fluid supply ports and a fluid discharge port formed in the fluid supply/discharge head. In a prior-art fluid supply/discharge head 5a, for example, as shown in FIGS. 5 and 6, fluid supply ports 71 and a fluid discharge port 61 which are open to face an inner portion of the bladder are formed on the same plane.

FIG. 5 is a vertical sectional view of a prior-art fluid supply/discharge head 5a and FIG. 6 is a sectional view taken along a line C-C in FIG. 5. On the same plane of a head block 50, unequally spaced six fluid supply ports 71 and a fluid discharge port 61 are formed and four fixing bolts 60 for mounting the head block 50 to a bag head 4 are provided.

If the fluid supply ports 71 and the fluid discharge port 61 are formed on the same plane as in the prior art, however, a degree of freedom in design is reduced and location and the number of both the fluid supply ports and fluid discharge port are restricted.

Especially, from the fluid discharge port, drain water resulting from condensation of steam is discharged from an inside of the bladder. For quick discharge, it is preferable to increase an area of the fluid discharge port to thereby increase a discharge capacity.

From the fluid supply ports, on the other hand, a heated steam or the like is spouted into the bladder. In order to quickly and uniformly fill the heated steam into the bladder, it is preferable to form a large number of equally spaced fluid supply ports.

In other words, to reduce a cycle time of a tire vulcanizing step and to increase productivity, it is necessary to quickly discharge the drain water from the fluid discharge port and to quickly and uniformly fill the heated steam or the like into the bladder from the fluid supply ports.

The present invention is made for the purpose of solving the prior-art problems mentioned above and accomplishes quick discharge of the drain water by increasing the area of the fluid discharge ports to thereby increase the discharge capacity.

Moreover, the number of fluid supply ports is increased and the ports are spaced equally to thereby quickly and uniformly fill the heated steam or the like into the bladder.

In this way, it is an object of the invention to provide the fluid supply/discharge head of the bladder in the tire vulcanizing machine in which the cycle time of the tire vulcanizing step is reduced to thereby increase productivity.

DISCLOSURE OF THE INVENTION

In order to achieve the object mentioned above, in accordance with the present invention (claim 1), there is provided a fluid supply/discharge head of a bladder in a tire vulcanizing machine comprising upper and lower metal molds and the bladder expanded and contracted by supplying and discharging a fluid, the bladder expanded by supplying the fluid being pressed to an inner surface of a green tire which is set to an inner portion of the metal molds, wherein a fluid supply port and a fluid discharge port open to face an inside of the bladder are formed in a head block, the fluid discharge port is disposed on a lower side of the head block, the fluid supply port is disposed on an upper side of the head block, and the fluid discharge port and the fluid supply port are not disposed on the same plane.

In accordance with an aspect (claim 2), there is provided a fluid supply/discharge head of a bladder in a tire vulcanizing machine according to claim 1, wherein the head block is formed of a lower block and an upper block mounted to an upper face of the lower block, the fluid discharge port is formed in the lower block, the fluid supply port is formed in the upper block, and the fluid discharge port and the fluid supply port are not disposed on the same plane.

BEST MODE FOR CARRYING OUT THE INVENTION

Figure 1:
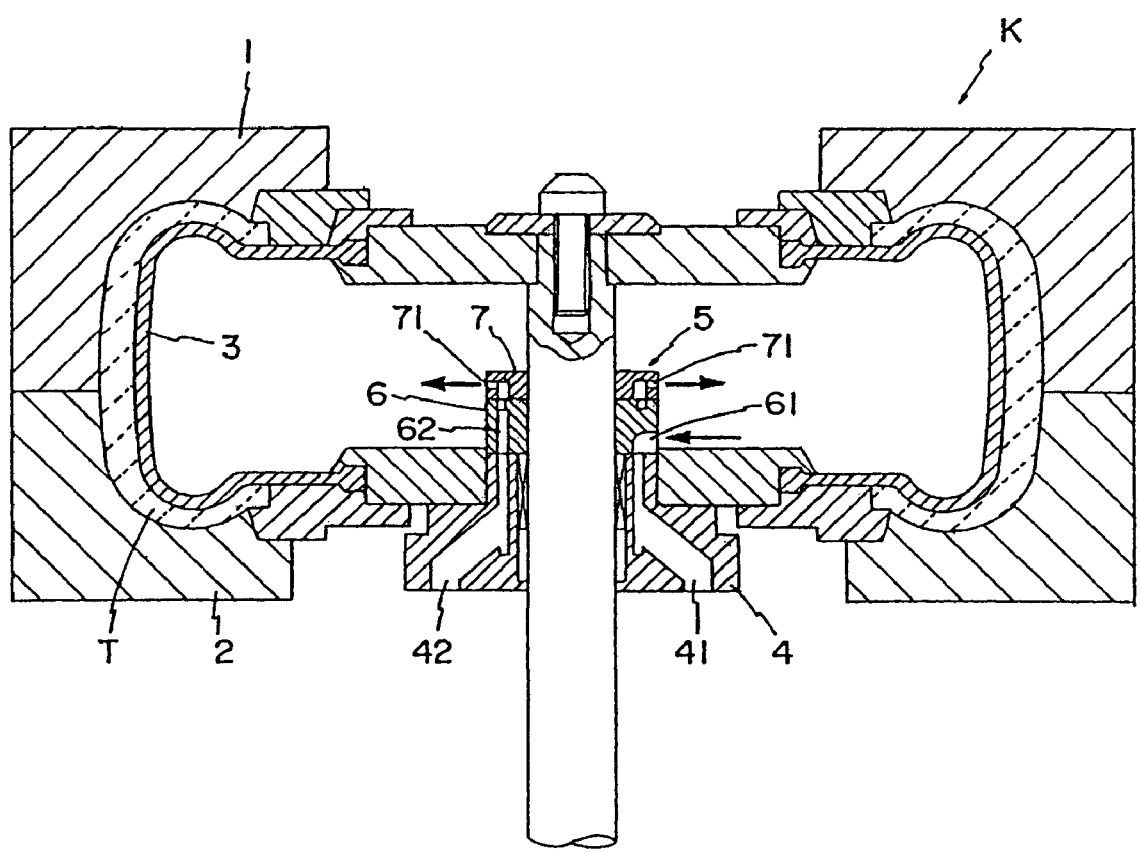
FIG. 1 is a schematic sectional view of an embodiment of a tire vulcanizing machine including a fluid supply/discharge head.

A description will be given below of a mode for carrying out the present invention on the basis of an embodiment shown in the drawings. A concrete structure of the invention is not limited to the following embodiment.

Figure 2:
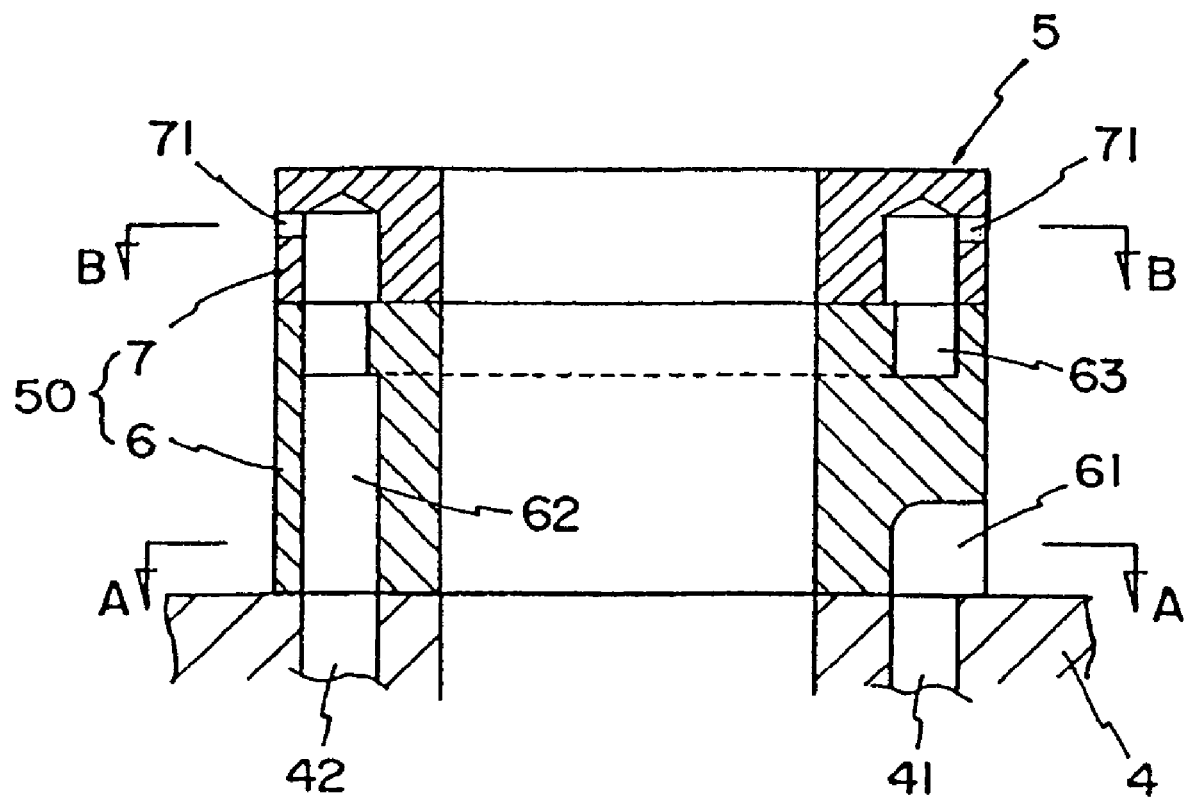
FIG. 2 is a vertical sectional view of the fluid supply/discharge head which is an embodiment of the invention.
Figure 3:
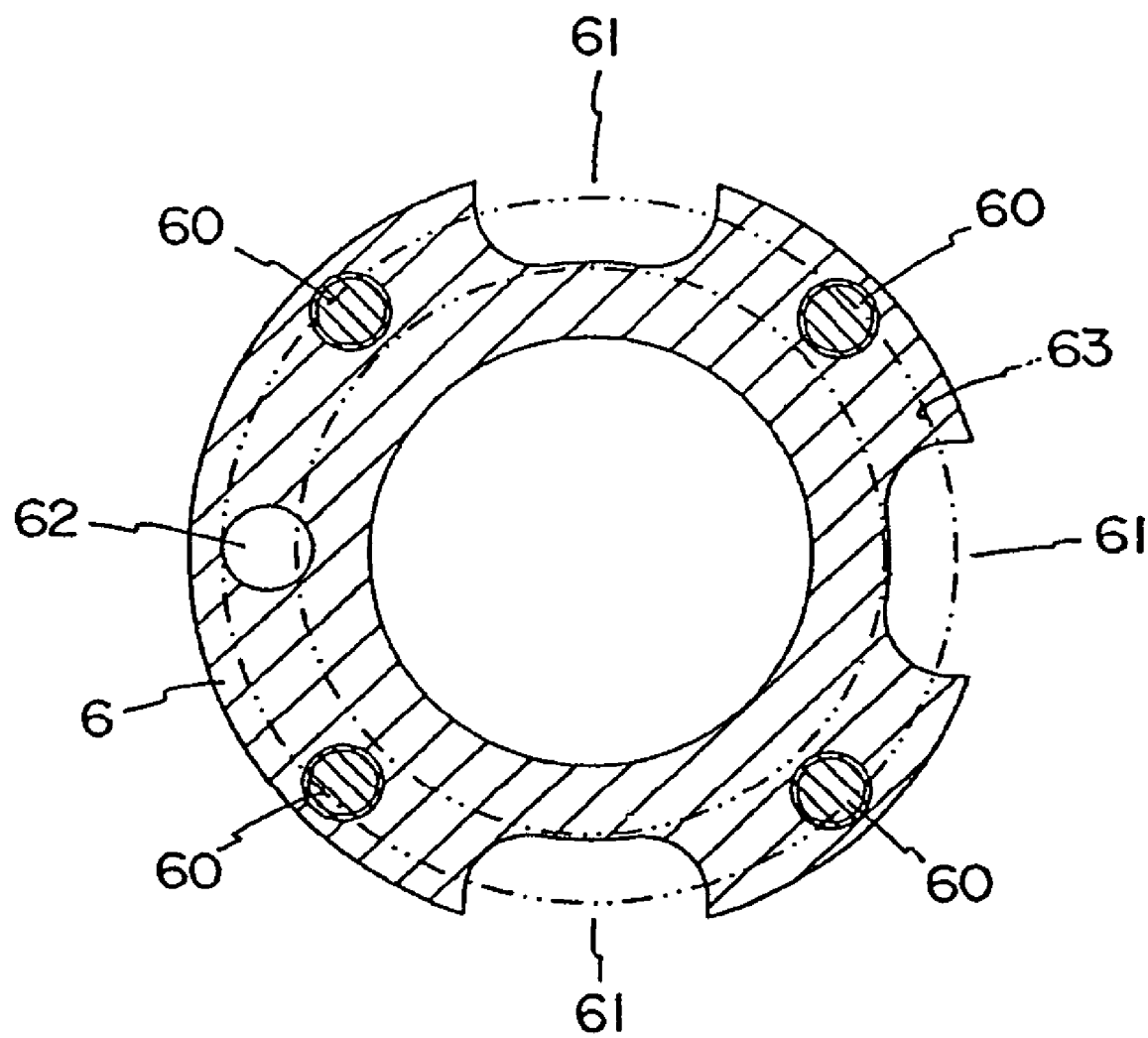
FIG. 3 is a sectional view taken along a line A-A in FIG. 2.
Figure 4:
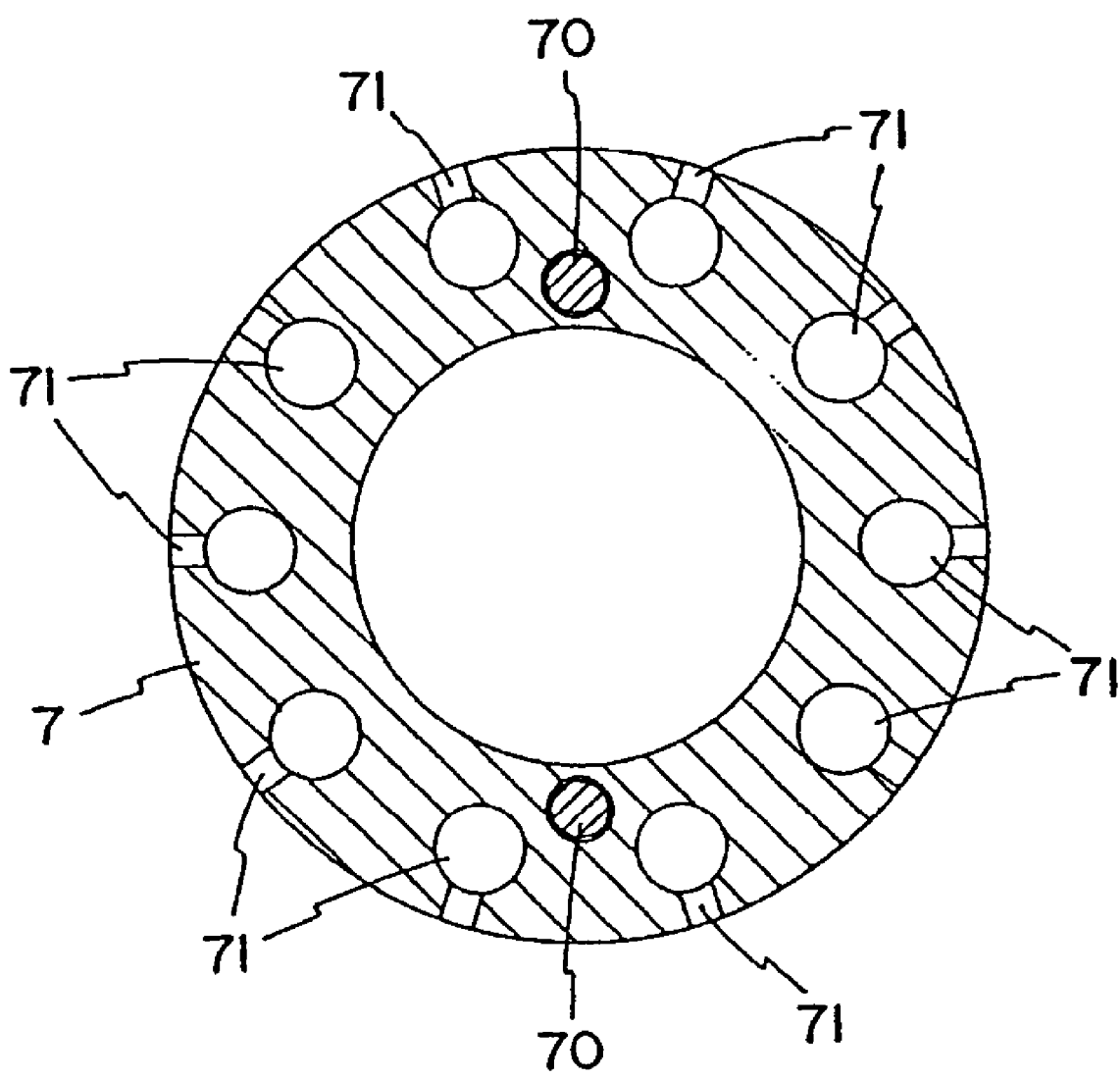
FIG. 4 is a sectional view taken along a line B-B in FIG. 2.

FIG. 1 is a schematic sectional view of an embodiment of a tire vulcanizing machine including a fluid supply/discharge head. FIG. 2 is a vertical sectional view of the fluid supply/discharge head which is an embodiment of the invention. FIG. 3 is a sectional view taken along a line A-A in FIG. 2. FIG. 4 is a sectional view taken along a line B-B in FIG. 2.

As shown in FIG. 1, the tire vulcanizing machine K is provided with upper and lower metal molds 1 and 2 and a bladder 3 expanded and contracted by supplying and discharging a heated fluid, and is structured such as to vulcanize a green tire T while holding, by pressing the bladder 3 expanded by supplying the fluid to an inner surface of the green tire T set in inner portions of the metal molds 1 and 2.

A bag head 4 is provided to a central portion of a lower surface of the bladder 3 and a fluid supply/discharge head 5 is mounted to an upper surface of the bag head 4 as shown in FIG. 2.

A head block 50 of the fluid supply/discharge head 5 is formed of a lower block 6 and an upper block 7 mounted to an upper face of the lower block 6.

The upper block 7 is mounted to the lower block 6 through two mounting bolts 70 at intervals of 180° as shown in FIG. 4 and the lower block 6 is mounted to the upper face of the bag head 4 through four fixing bolts 60 at intervals of 90° as shown in FIG. 3.

At an outer periphery of a lower end of the lower block 6, as shown in FIG. 3, three fluid discharge ports 61 are formed to be open to face an inside of the bladder 3 and one communicating hole 62 is formed to pass through the lower block 6. The one communicating hole 62 and the three fluid discharge ports 61 are formed at intervals of 90°.

The three fluid discharge ports 61 are respectively connected to discharge holes 41 formed in the bag head 4 and the discharge holes 41 are connected to fluid discharge paths (not shown).

A lower end of the communicating hole 62 is connected to a supply hole 42 formed in the bag head 4 and an upper end of the hole 62 communicates with an annular groove 63 formed in the upper face of the lower block 6.

At an outer periphery of the upper block 7, as shown in FIG. 4, ten fluid supply ports 71 are formed while equally spaced at intervals of 36° to be open to face the inside of the bladder 3. By connecting the respective fluid supply ports 71 to the annular groove 63, the respective fluid supply ports 71 are connected to a fluid supply pipe (not shown) through the annular groove 63, the communicating hole 62, and the supply hole 42.

As described above, the head block 50 of the fluid supply/discharge head 5 is formed as the separate lower block 6 and upper block 7, the fluid discharge ports 61 are formed in the lower block 6, and the fluid supply ports 71 are formed in the upper block 7. In this way, the fluid discharge ports 61 and the fluid supply ports 71 are not provided on the same plane.

In the present embodiment, the three fluid discharge ports 61 are formed in the lower block 6 and the ten fluid supply ports 71 are disposed at equal intervals in the upper block 7.

Figure 5:
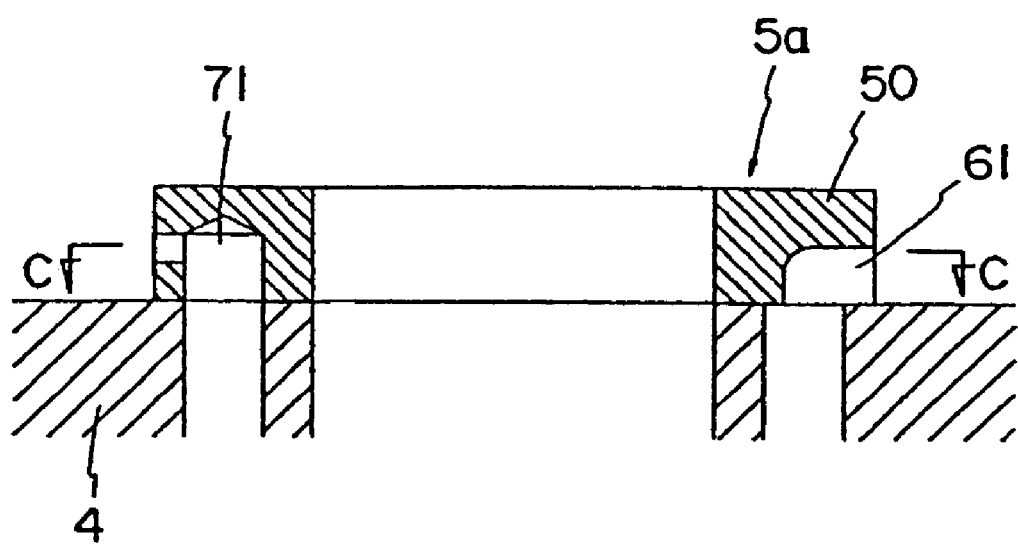
FIG. 5 is a vertical sectional view of a prior-art fluid supply/discharge head.
Figure 6:
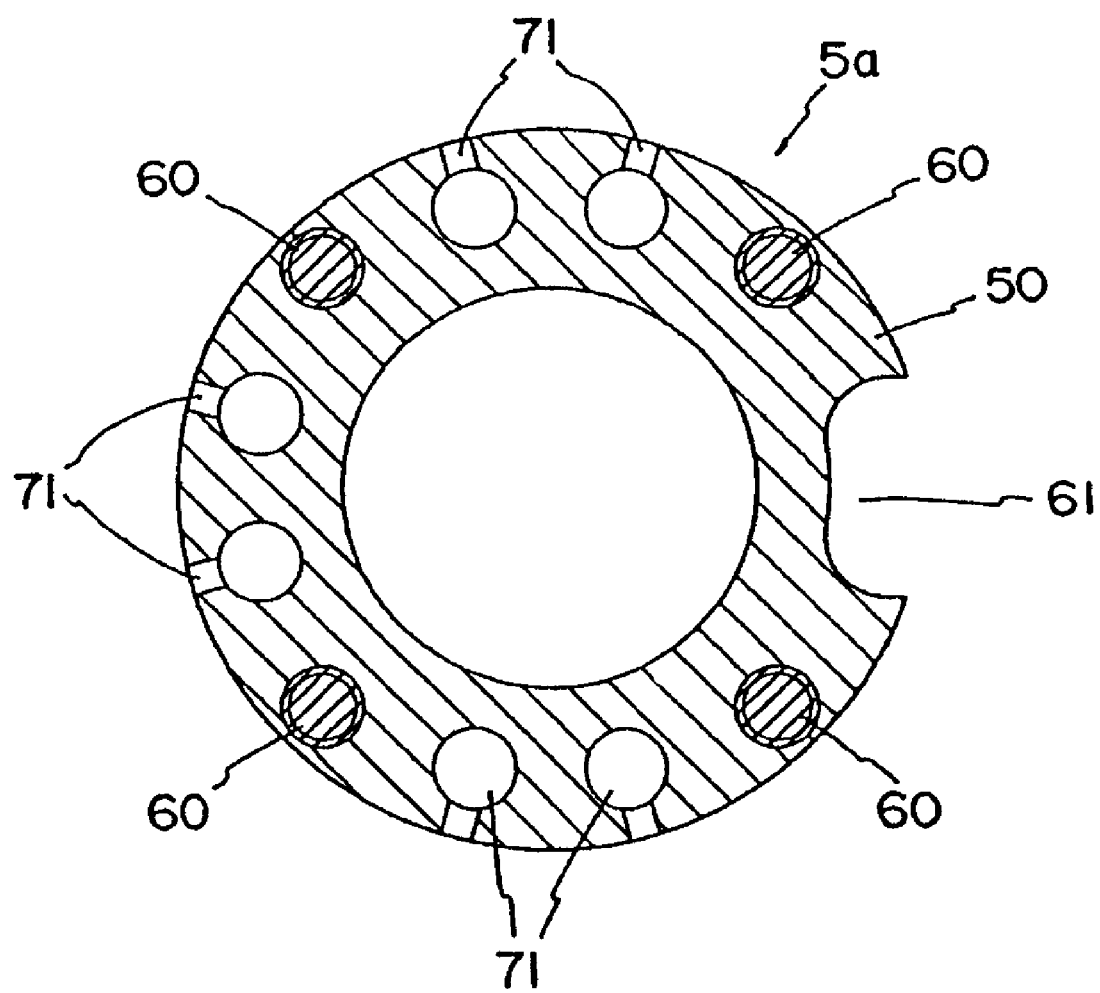
FIG. 6 is a sectional view taken along a line C-C in FIG. 5.

As a result, as compared with the prior-art fluid supply/discharge head shown in FIGS. 5 and 6, an area of the fluid discharge port(s) can be increased by three times and a discharge capacity increases by an amount corresponding to the increase in the area. Therefore, it is possible to quickly discharge drain water.

The number of the fluid supply ports can also be increased to ten and can equally be spaced as compared with the prior-art fluid supply/discharge head. As a result, the heated steam or the like can quickly and uniformly be filled into the bladder.

Thus, the cycle time of the tire vulcanizing step can be reduced to increase productivity.

In the invention, the number of the fluid discharge ports 61 is not limited to three as in the embodiment. It is also possible to form each the fluid discharge port with a wide opening width and to reduce the number thereof or it is possible to form each the fluid discharge port with a narrow opening width and to increase the number thereof. To put it briefly, the fluid discharge ports may be designed with such opening width and number as to ensure a large discharge capacity from the fluid discharge ports and a degree of freedom in design can be increased in the invention.

The number of the fluid supply ports 71 is not limited to 10 as in the embodiment either. It is desirable that as many fluid supply ports 71 as possible are equally spaced and the degree of freedom in design can be increased in the invention.

The numbers of the mounting bolts 70, the fixing bolts 60, and the communicating hole 62 can also be determined properly and the annular groove 63 may be formed in the lower face of the upper block.

INDUSTRIAL APPLICABILITY

As described above, in accordance with the fluid supply/discharge head of the present invention, since the fluid discharge ports and the fluid supply ports are not formed on the same plane, it is possible to increase the area of the fluid discharge ports to increase the discharge capacity to thereby quickly discharge the drain water.

It is also possible to increase the number of fluid supply ports and to equally space the ports to thereby quickly and uniformly fill the heated steam or the like into the bladder.

As a result, the cycle time of the tire vulcanizing step can be reduced to thereby increase productivity.

What is claimed is:

1. A fluid supply/discharge head of a bladder in a tire vulcanizing machine comprising:
   upper and lower metal molds; and
   the bladder expanded and contracted by supplying and discharging a fluid,
   the bladder expanded by supplying the fluid being pressed to an inner surface of a green tire which is set to an inner portion of the metal molds,
   wherein a fluid supply port and a fluid discharge port open to face an inside of the bladder are formed in a head block,
   the fluid discharge port is disposed on a lower side of the head block, the fluid supply port is disposed on an upper side of the head block, and the fluid discharge port and the fluid supply port are not disposed on the same plane.

* * * * *